Figure 1:
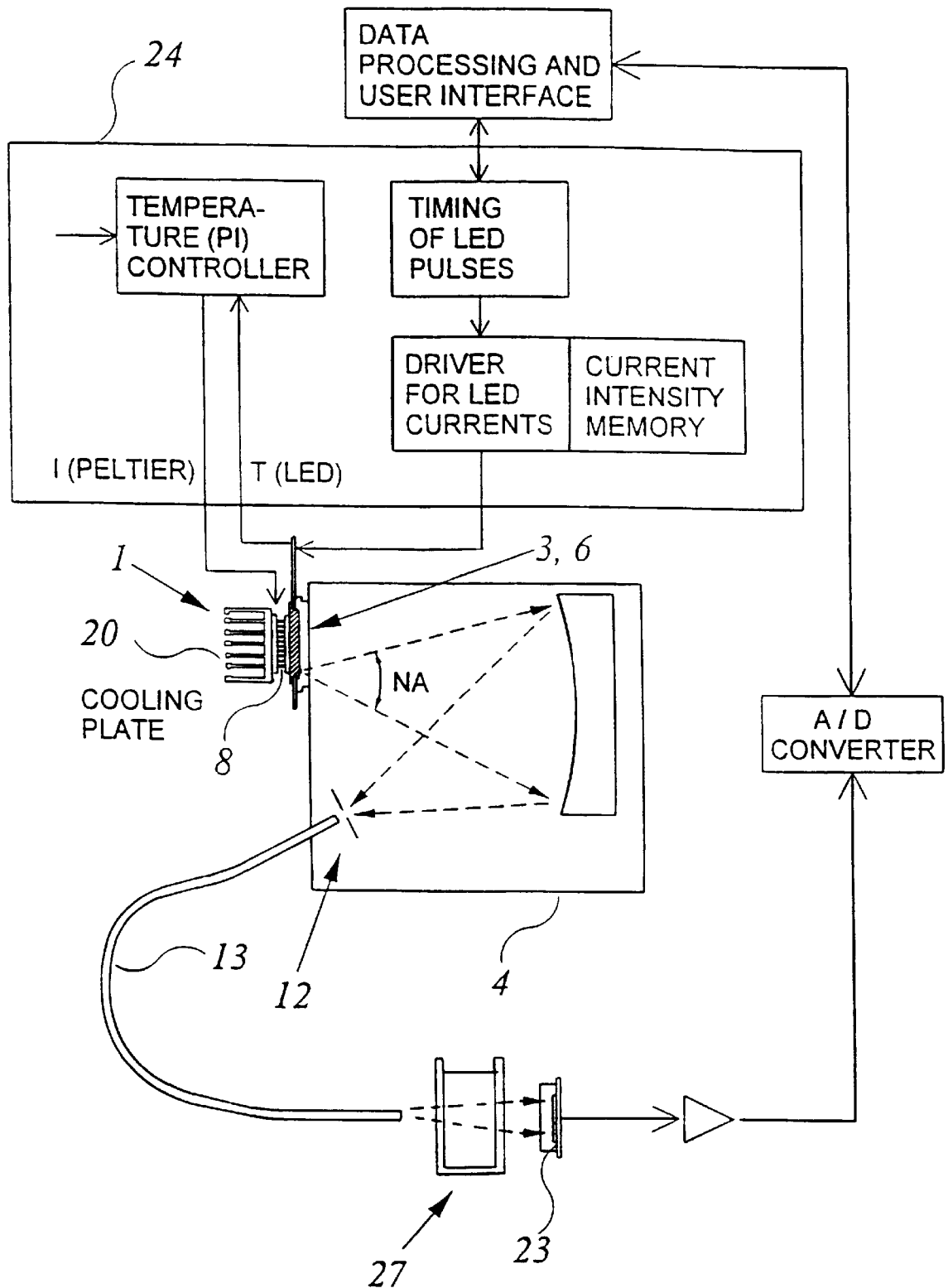

United States Patent

Malinen

[11] Patent Number: 6,075,595
[45] Date of Patent: Jun. 13, 2000

[54] SPECTROMETER

[75] Inventor: Jouko Malinen, Espoo, Finland

[73] Assignee: Valtion Teknillinen Tutkimuskeskus, Espoo, Finland

[21] Appl. No.: 09/230,138

[22] PCT Filed: Jul. 17, 1997

[86] PCT No.: PCT/FI97/00451

§ 371 Date: Jan. 19, 1999

§ 102(e) Date: Jan. 19, 1999

[87] PCT Pub. No.: WO98/03842

PCT Pub. Date: Jan. 29, 1998

[30] Foreign Application Priority Data

Jul. 17, 1996 [FI] Finland ..................................... 962886

[51] Int. Cl.[7] .................................. G01J 3/10; G01J 3/18
[52] U.S. Cl. .............................................................. 356/328
[58] Field of Search ..................................... 356/326, 328

[56] References Cited

U.S. PATENT DOCUMENTS 5,029,245  7/1991  Keranen et al. .......................... 356/328
5,257,086  10/1993  Fateley et al. ............................ 356/328
5,477,322  12/1995  Webster .................................... 356/328

*Primary Examiner*—F. L. Evans
*Attorney, Agent, or Firm*—Cohen, Pontani, Lieberman & Pavane

[57] ABSTRACT

The present invention concerns an LED spectrometer operating without moving parts according to the sweep principle, and appropriate to serve as a structural component in many kinds of spectroscopic concentration analyzers. The design of the invention affords the advantage that, even at its minimum, the optical power of the LED spectrometer of the invention is about fivefold compared with the designs of prior art. Furthermore, improvement of the efficiency of the LED radiation source and of that of the optics has brought a multiple augmentation in power to the wavelength spectrum sent out by the radiation source. In the design of the invention, concentrators (6) of non-imaging type are used to collimate the wavelength spectrum emitted by the LEDs (3).

14 Claims, 4 Drawing Sheets

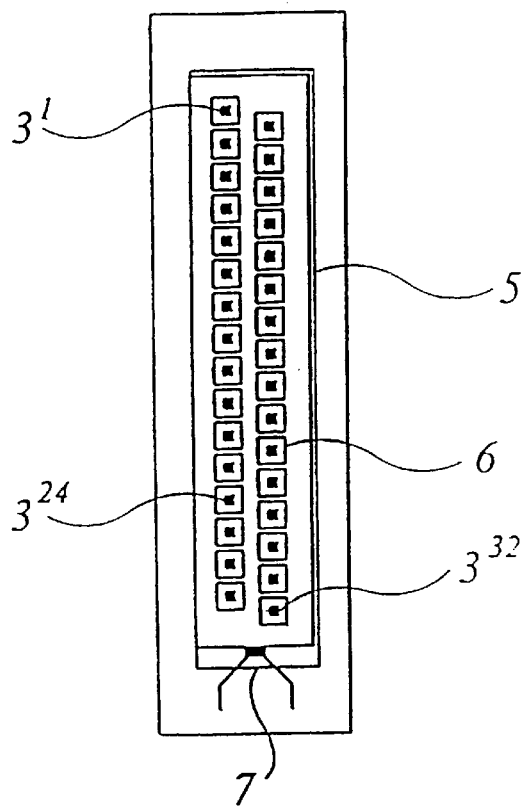
*Fig. 2a*
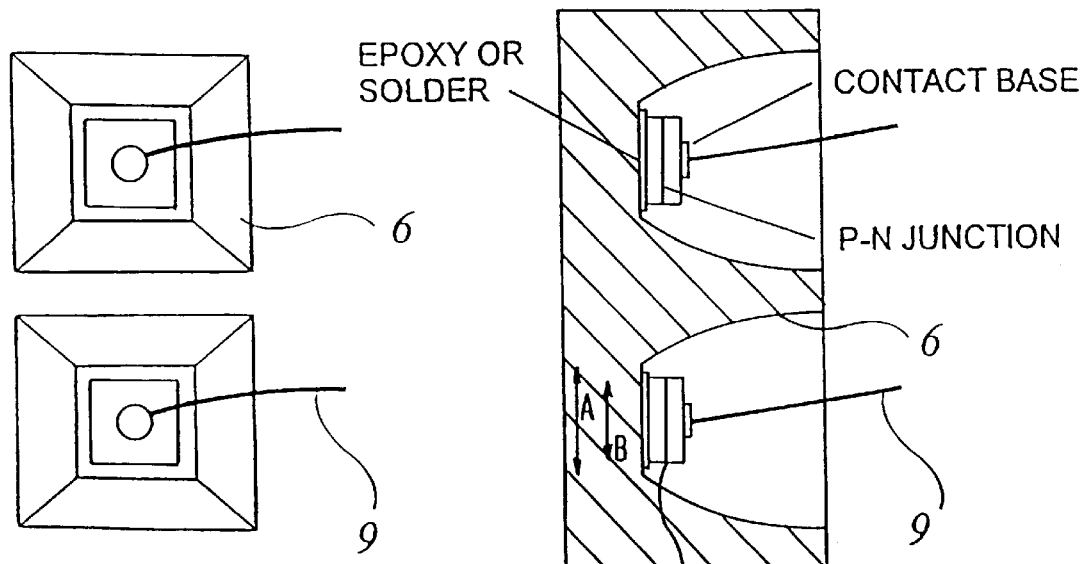
*Fig. 2 c(II)*  *Fig. 2 c(I)*

SPECTROMETER

The present invention concerns a spectrometer. The invention particularly concerns an LED (light emitting diode) spectrometer operating without moving parts, applying the sweep principle, and intended to be used as a structural component in measuring apparatus.

It is possible, by means of designs based on a line of LEDs and on stationary grating optics, to implement a sweep spectrometer operating without moving parts and appropriate to be used for structural component in a wide variety of spectroscopic concentration analysers and calorimetric instruments. In such measuring apparatus, information is gained concerning chemical composition, colour or any other physical characteristic of a sample by means of measuring the transmission or reflection spectrum from the sample in a given, desired wavelength range. Present technology enables LED radiation sources to be produced at least for the wavelength range from 430 to 4800 nm; it is therefore possible, in principle, to utilize a spectrometer based on an LED radiation source, in widely different measurement applications in the visible light and infrared ranges. The best chances for application of the LED spectrometer are perhaps to be found in the wavelength range under 1100 nm; representing a well-tested, mature branch of technology, LED radiation sources in this range are available from a number of commercial manufacturers, as high power, favourably priced components. One of the practical applications that can be contemplated thus consists pf measurement of fat, albumin and water content of foodstuff raw materials, which are carried out, at present, with concentration analysers based on measuring the 800 to 1050 nm transmission spectrum.

The LED spectrometer has been further developed in recent years, in a variety of projects. The construction and operating principle of an adjustable LED radiation source that has been worked out is known through the International Patent No. WO 88/10462. The design described in this reference presents the salient feature that the intensity of the output beam from an LED radiation source module is controlled, or maintained constant, by measuring this intensity and, on the basis of such measurement, adjusting the current passing through the respective LED. The apparatus disclosed by the reference comprises, as an essential component thereof, a beam divider, a monitoring detector, and appropriate signal processing, so that it might be possible during operation to measure the intensity of the output beam.

Furthermore, there is known, through International Patent No. WO 94/15183, a spectrometer radiation source and its tuning arrangement. The radiation source of said reference, comprising a light element base and a plurality of light elements, these light elements being disposed on said light element base in linear array with a given spacing, and optics means disposed in conjunction with the radiation source, for collecting the radiation produced by the light elements, for dispersing it to a predetermined wavelength spectrum and for aiming it at the object of measurement, will produce between 2 and 16 measuring wavelength bands having comparatively narrow half-value widths. Moreover, by the aid of the tuning arrangement described in the reference, tuning of the radiation source is performed, this operation comprising such adjustment of the locations in relation to each other of the optics and light elements that wavelength bands can be formed such as are desired.

It has been successfully demonstrated by means of the above-described, implementation designs of the first generation spectrometer, based on LED technique, that this technique is generally operational; and potential applications of the technique have been successfully studied e.g. in concentration measuring apparatus in foodstuff industry. However, any introduction of the LED spectrometer in its use as a core component of industrially manufactured concentration analysers, and calorimeters, implies substantially enhanced performance and/or less expensive manufacturing, compared with the spectrometer technology presently employed in measuring apparatus of this kind. Existing types of apparatus are most commonly based on using an incandescent lamp for radiation source and a swivelling grating serving the task of spectral dispersion (sweeping grating spectrometer), on a rotating filter disk carrying a plurality of interference filters, or a stationarily mounted combination of grating and detector array. With implementation designs of the LED spectrometer known up to date no substantially superior technical level of performance or significantly lower manufacturing costs were achieved which would have resulted in any extensive acceptance of LED techniques as a principle for implementing concentration and colour analysers.

In the following is presented a synopsis, based on studies made using experimental apparatus, of the technical problems of first generation LED spectrometry and of its inherent limitations in applications relating to foodstuff raw materials. What is held forth here is also extensively applicable in regard to other practical applications based on spectral measurement or colorimetry.

Typically, an LED spectrometer module suited for measurements on foodstuffs is desired to produce at least 32, spectrally narrow measuring bands in a wavelength range covering, at least, the wavelengths between 830 and 1050 nm, and one desires to use the module in measurements of the transmission spectra of foodstuffs. Typically, one desires to measure the absorbance spectrum on the level of 2 to 4 O.D., equivalent in terms of sample transmittance to a range of T=0.01 to 0.0001 (Absorbance=log $10(1/T)$). It is further desired that the amplitude/noise ratio of the spectrum which is measured be $10^3$ to $10^4$. For these reasons, the optical power of the spectrometer's output beam has to be high—at least 7 to 8 decades over the noise level of the receiver—in order that the desired signal/noise ratio might be achieved when measuring powerfully attenuating samples. The optical efficiency and output beam power of LED spectrometry of prior art only meet the requirements in the best spectrum bands, while the greatest problems are encountered on the extreme fringes of the wavelength scale, 830 to 850 nm and 1000 to 1050 nm.

Secondly, utilization of a multiple channel spectrometer in a concentration analyser implies that a calibration is made, which is usually based on methods of multiple component analysis (PLS, for instance). The search for the calibration parameters necessitates measurements on extensive series of samples, and performing any concentration measurements by means of a reference procedure. Working out a good calibration often constitutes an exacting task requiring much time and involving expenses. It is therefore desirable that calibrations worked out for commercial concentration analysers can be transferred to other equivalent analysers. The previous LED spectrometer fails to meet the requirements imposed by such calibration transfer because the wavelengths of the spectral bands produced by individual LED radiation sources are only identical within about ±2 to 5 nm. As a consequence, every concentration measuring device has to be separately calibrated. It has been learned from experience gained in measurements on foodstuffs that calibrations are easier to transfer if the central wavelengths of the bands are identical within error limits of ±0.3 to ±0.5 nm when operating in the 830 to 1050 nm wavelength range.

Thirdly, the wavelength of the radiation produced by the LED source and its intensity are strongly dependent on temperature: typically, the intensity from an LED component decreases, and the wavelength increases, with increasing operating temperature. It is possible to stabilize the untensity of an LED spectrometer's measuring beam by measuring the intensity of the output beam and controlling the current of the respective LED. As for wavelength, the temperature dependence of an LED spectrometer is less than the wavelength dependence of the LED alone: the grating optics delimits the measuring beam to a narrow spectral band and attenuates the changes in wavelength due to temperature. In spite of what has just been said, the temperature dependence of the central wavelengths of the LED spectrometer module described in the foregoing is about 0.3 nm per 1.0° C., at its maximum. Temperature dependence of the output beam's wavelength in this magnitude may well give rise to errors of measurement in a concentration analyser based on spectroscopy, in the case of varying ambient conditions.

Fourthly, the radiation should be completely damped out in the inhibition band outside the measuring band, in an ideal spectrometer. In spectrometers based on use of an interference filter, as a rule, transmission is less than 0.1% in the inhibition band. In LED spectrometers, many of the measuring bands are produced from the marginal areas of the respective LED's emission spectrum. If the intensity from the LED at the wavelength of a given, desired measuring band is no more than 10% of the peak wavelength intensity, achieving three decades attenuation in the inhibition band in the measuring beam implies, in practice, four decades attenuation at the LED's peak wavelength. Typical LED chips radiate into semispace, and part of the cone of radiation strikes the enclosure of the module structure. Therefore, part of the radiation may be scattered or reflected back to the output slit and thus be propagated along with the measuring beam. Owing to these problems, sufficient inhibition band attenuation is not achieved in the case of the weakest measuring bands, in the LED radiation source module of prior art.

The objective of the present invention is to abolish the problems brought forth in the foregoing. Specifically, the object of the present invention is to disclose a spectrometer of novel type in which the technical problems described above can be avoided.

It is a further objective of the present invention, to disclose a spectrometer by the aid of which any desired number of radiation spectra can be produced, at different wavelengths, and in which the calibration made with one spectrometer can also be used in measurements carried out with other equivalent spectrometers.

It is furthermore an objective of the present invention, to disclose a spectrometer which is amenable to being advantageously industrially manufactured and which can be produced employing generally available industrial methods and subcontracting facilities.

Regarding the features characterizing the invention in hand, reference is made to the claims.

The spectrometer of the invention comprises a radiation source, comprising a light element base and a plurality of light elements, these light elements being arranged on the light element base in linear array, with predetermined spacing. Furthermore, the spectrometer of the invention comprises optical means disposed in connection with the radiation source, to collect the radiation produced by the light elements, to disperse it to a predetermined wavelength spectrum, and to guide it to the object under measurement. The spacing of light elements located side by side in principle, and the linear wavelength dispersion ($\Delta x/\Delta\lambda$) are so dimensioned that, for each light element, the spectrum band of desired wavelength will emerge through the spectrometer's output slit. As taught by the invention, the radiation source comprises a reflector base, disposed in conjunction with the light element base, on which the the light elements have been arranged and which comprises, assigned to each light element and disposed in conjunction with each light element, a concentrator for directing the radiation emitted by each light element into a predetermined solid angle. Advantageously, each concentrator has been formed by embossing in the reflector base a depression of predetermined shape, the configuration of its bottom substantially matching the shape of the light element and the size of said bottom equivalent to the size of the entire light element augmented by allowable positioning tolerance, this bottom configuration being usefully applied in accurately positioning the LED chips. The concentrator may be a concentrator of non-imaging type such as is commonly described in the relevant literature.

In an advantageous embodiment of the present invention, the light elements are arranged in two parallel rows in such manner that adjacent light elements are intercalated. By this construction, smaller size is achieved in designing the light sorce and optics. Advantageously, the reflector base as well as the reflector surface of the concentrator is coated with a reflecting substance.

In an advantageous embodiment of the present invention, the reflector base is made of electrically and thermally conductive material, such as copper, for instance. Advantageously, the radiation source incorporates a measuring element connected in thermally conductive fashion with the reflector base, for measurement of its temperature. The radiation source moreover comprises a Peltier element connected in thermally conductive fashion with the reflector base, close to the light elements, for cooling and/or heating the radiation source. This allows efficient compensation for the warming-up of the LEDs, as well as rendering constant the wavelength of the radiation which they emit. In addition, the measuring element of the present invention, the Peltier element and the thermal structure of the LED, in combination, enable temperature stabilization to be provided, by the aid of which the temperatures of the LED elements are maintained constant during operation. The intensities and wavelengths of the LED spectrometer's bands will then be constant in spite of variations in ambient conditions. Thus, the stability in operating conditions of the concentration measuring apparatus or colorimeter can be improved without recourse to measuring the output beam intensity and without control, on the basis of this measurement, of the current passing through the respective LED, as disclosed in the above-cited reference WO 88/10462.

Furthermore, electrical leads are provided on the light element base for elctric supply of the light elements, and the light elements are attached to the reflector base with an electrically conductive substance, electrical contact with each light element being provided from the reflector base.

In an advantageous embodiment of the present invention, the radiation source comprises a window element, disposed substantially above the light elements and concentrators, to protect them against ambient influence. Moreover, the intervening space between this window element and the light elements is filled with translucent substance, such as extra pure epoxy or silicone.

In an advantageous embodiment, the radiation source comprises an output slit, disposed in the vicinity of the radiation source, and an optical fibre, connected to the output slit, for conducting the radiation emerging from the output slit, to the object under measurement.

In an advantageous embodiment of the present invention, the optical means comprise a first prism, disposed substantially adjacent to the radiation source to receive radiation emitted by the radiation source; a plane mirror provided with a piercing aperture for letting the radiation emitted by the radiation source to pass through the plane mirror; a second prism, communicating through the plane mirror with the first prism; a reflection grating for dispersing the radiation emitted by the radiation source to a wavelength spectrum; and a concave mirror, at a distance from the radiation source and disposed in conjunction with the second prism to reflect the radiation onto the reflection grating and through the pass-through aperture to the output aperture. Advantageously, the wavelength spectrum generated with each light element is arranged to pass through the pass-through aperture, to be reflected by the concave mirror onto the reflection grating and from the reflection grating over the plane mirror and concave mirror, once again through the pass-through aperture and further to the output slit.

Further, in an embodiment of the invention, the locations with reference to each other both of the light elements, plane mirror, concave mirror, reflection grating and the output slit are so arranged that at the output slit a different wavelength spectrum is produced in correspondence with each light element.

The advantage of the present invention over previously known technology is optical power output in the beam proceeding through the output slit, demonstrated by measurements to be about fivefold compared with that of the previous LED spectrometer module. The enhancement of power output is a result of increased numerical aperture of the LED radiation source and of the optical means, and to increased transmission. This increased optical power output renders possible measurements with good signal/noise ratio on strongly attenuating foodstuff samples. Moreover, at the extremes of the wavelength scale the increment is even greater than this, owing to new LEDs which have been introduced in the radiation source.

Further, thanks to the invention, it now becomes possible in the location of the elements of the LED radiation source to achieve requisite accuracy of positioning, whereby better matching is attainable between the wavelength scales of individual LED spectrometers which are being manufactured. We have been able, employing the techniques of the invention, to turn out four LED spectrometer modules having identical central wavelengths within ±0.4 nm. Good reproducibility of wavelength scales affords better chances than many competitive techniques can claim, for calibration transfer from instrument to instrument.

In addition, thanks to the present invention, diffuse light occurring in the spectral inhibition band has now been brought down to the same level as in spectrometers based on interference filters. Measurements performed in a trial have shown that the diffuse light is below 0.1% on most channels and even on the faintest channels, less than 0.3% of the band's peak intensity, as measured at ±36 nm distance from the central wavelength of the band.

It is a further advantage of the invention over the state of art, that the construction of the LED spectrometer of the invention is well suited for industrial manufacturing, involving reasonable manufacturing costs. The components of the LED radiation source and of the optics can all be produced by means of commonly used procedures, using available subcontracting facilities. The construction incorporates no "fenestrated" grating as previous LED radiation sources do; such gratings have the drawbacks of limited availability and high price. Instead, the present design uses a reflection grating of standard type.

Figure 2B:
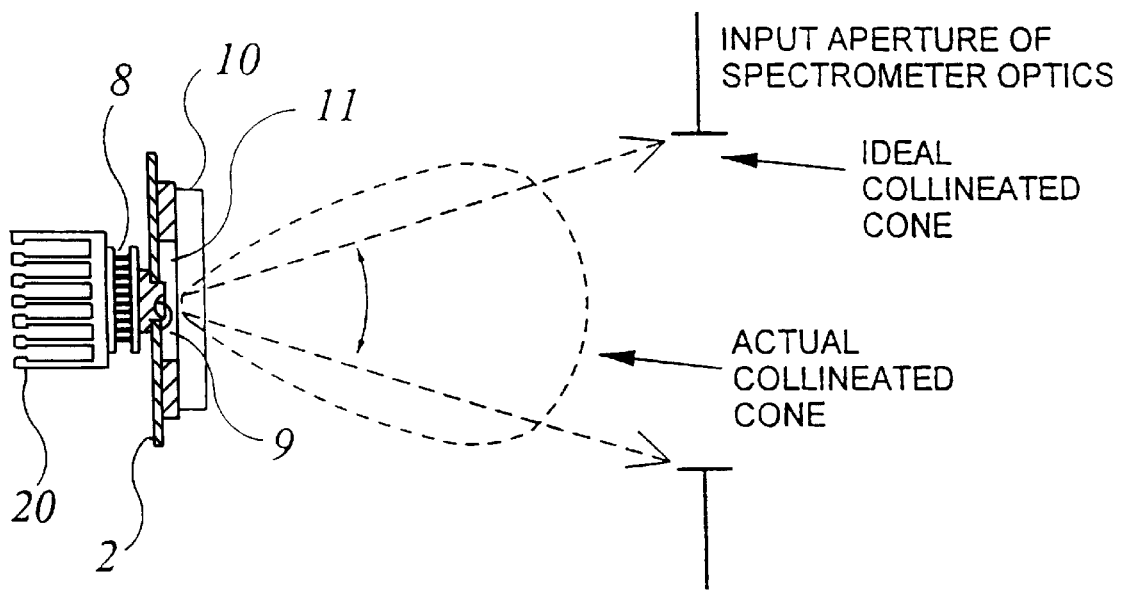
Figure 3:
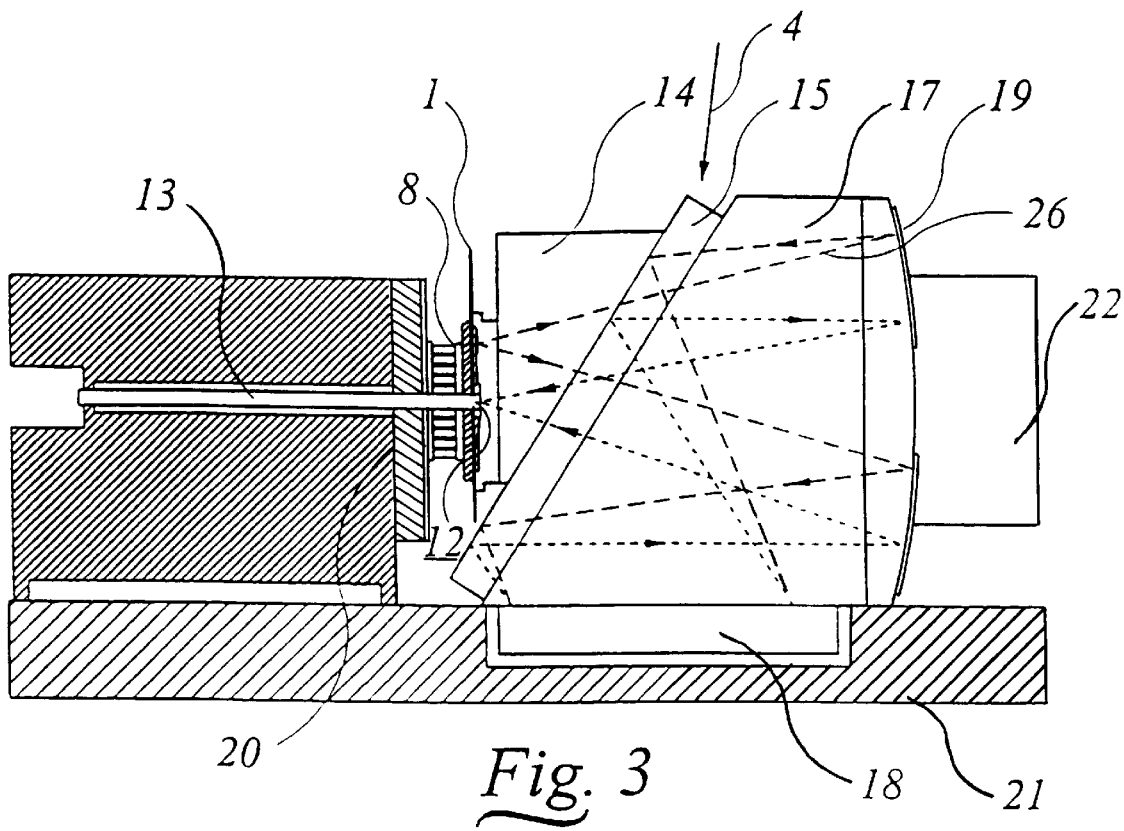
Figure 4:
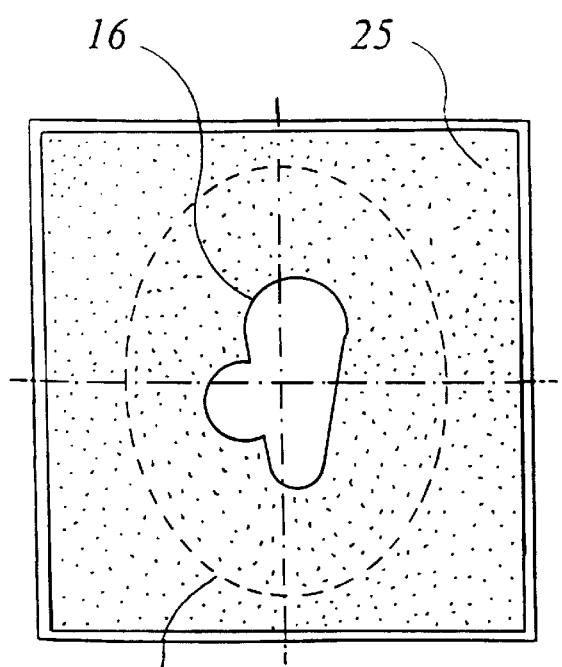

In the following, the invention is described with the aid of attached embodiment examples, referring to the attached drawing, wherein:

FIG. 1 presents, schematically, an LED spectrometer according to the invention;

FIG. 2a displays a group of LED radiators produced on a reflector base, according to the invention;

FIG. 2b displays the design of the LED radiation source and the principle of dimensioning the concentrators;

FIG. 2c displays a reflecting depression according to the invention and illustrates the utilization of its bottom in accurate positioning of the LED chip;

FIG. 3 presents an implementation of the optical means, according to the invention; and FIG. 4 presents the coating arrangement of a plane mirror.

FIG. 1 presents the principle diagram of an LED spectrometer conforming to the invention. The spectrometer includes an LED radiation source 1 with light elements 3. In conjunction with each light element, an optical concentrator 6 has been provided, which concentrates the radiation from the light element in a solid angle arranged to equal the numerical aperture of the spectrometer. To the radiation source 1, in conjunction with the reflector base, has been attached, in thermally conductive fashion, a Peltier element 8, by the aid of which the heat generated by the light elements $3^1 \ldots 3^n$ is transported over a cooling plate 20 to ambient air, in order to stabilize the radiation wavelength.

Furthermore, a control electronics assembly 24 has been connected to the radiation source, containing a temperature controller and timing and drive circuits associated with the task of pulsing the light elements. The temperature controller is advantageously implemented as a PI controller, and it is connected to the radiation source, to monitor representatively the temperature of the light elements $3^1 \ldots 3^n$. The temperature controller is further connected with the Peltier element 8 so that it becomes possible, as required, to cool or to heat the light elements $3^1 \ldots 3^n$ by mediation of the reflector base 5. The parameters of the temperature controller are preset so that the temperature controller will keep the temperature of the light elements substantially constant during the LED spectrometer's operation regardless of the waste heat produced by the apparatus and of any variations of ambient temperature within the normal operating temperature range, e.g. in the ambient temperature range from 0 to +50° C.

The timer circuits incorporated in the control electronics generate control pulses for each one of the light elements $3^1 \ldots 3^n$, which switch on one light element at a time, in succession. The duration T of these control pulses is advantageously 100 to 500 $\mu$s, and each pulse switches on the respective light element for a period substantially equalling the pulse length. Each drive pulse is advantageously followed by a pulse interval of equal length, during which none of the light elements is activated. Thus, the sweep time needed to activate all light elements $3^1 \ldots 3^n$ totals 2*T*n, whereafter the operation is continuously repeated. In the case of a typical LED spectrometer containing 32 light elements, the sweep frequency will thus lie between 20 and 200 Hz.

A drive circuit associated with each light element switches on the stabilized drive current to the light element for the duration of the control pulse. For each light element a drive current has been selected, its intensity advantageously between 10 and 1000 mA. The drive current intensities have been stored in a current memory carrying one or several sets of intensities for all light elements. This current memory is implemented by providing exchangeable current setting resistors for each light element, or by providing electronically settable current setting resistances for each light element, or by storing the current intensity values in an electronic memory circuit included in the drive circuits. A plurality of current intensity sets can be utilized in order to adapt the operation of the LED spectrometer so that maximum signal/noise ratio will be achieved in measurements on samples characterized by various optical attenuation.

The LED spectrometer further contains optical means 4 fixedly mounted in conjunction with the radiation source, which serve to collect the radiation produced by the radiation source, to disperse it to a predetermined wavelength spectrum, and to concentrate the spectrum on the output slit 12. FIG. 1 schematically illustrates the implementation of these optical means, employing a concave reflection grating. It is equally possible to provide for equivalent operation in the manner envisioned by the invention, also using a reflection-type or transmission-type plane grating, or a prism, to disperse the radiation to a predetermined wavelength spectrum. Further reference is here made to FIG. 3, which farther below presents an advantageous mode, based on use of a reflection-type planar grating, for arranging the optical means 4.

Behind the output slit 12, fibre optics 13 has been provided, by which the narrow spectral band that has passed through the output slit can proceed and impinge on the sample under measurement, 27. The amplitude of the radiation that has passed through the sample or has been reflected or scattered by it, carries information about the sample's properties, in the manner knwon in the art of spectroscopy or colorimetric technology. At the detector 23, is obtained a radiation pulse relating to each light element in turn and to the spectral band therewith associated, this pulse being converted to electrical form and amplified to appropriate level. In an LED spectrometer disposed to operate in the wavelength range of 800 to 1050 nm, an Si photodiode advantageously serves as detector, while with greater wavelengths Ge or InGaAsP photodiodes, for instance. may be used. The amplified light pulses are converted to digital form by means of an A/D converter, and the results are carried to a computer responsible for data processing to serve the concentration analyser or calorimeter, this computer performing requisite mathematical procedures and transferring the results from the measuring operations to be accessible by the operator.

In FIG. 2a, a radiation source 1 conforming to the invention is presented in greater detail, this radiation source comprising 32 light elements $3^1, \ldots, 3^{32}$, LED chips; a plurality of miniature-sized non-imaging concentrators $6^1, \ldots, 6^{32}$ integrated with the structure, in conjunction with each LED chip; and a thermal construction enabling good temperature stabilizing. In this connection, thermal construction is understood to mean that the LED chips are joined with the cold face of the Peltier element 8 and with the temperature measuring element 7, through a thermally well conductive reflector base 5, the LED chips are bonded to the reflector base 5 by low heat resistance, electrically conductive epoxy with silver filling, or by special solder, and on the other hand the LED chips are reasonably well insulated agaisnt ambient temperature variations by a poured epoxy or silicone mass 11 possessing high thermal resistance and by a cemented glass construction 4 constituting the optical means.

The procedure by which the reflector base 5 of the radiation source 1 is produced guarantees reproducible dimensions of the group of non-imaging concentrators $6^1, \ldots, 6^{32}$ in series production. Furthermore, the bottoms of the concentrators $6^1, \ldots, 6^{32}$ are dimensioned to match the size of the LED chips $3^1, \ldots, 3^{32}$, augmented by allowable positioning tolerances, thereby serving as alignment markers when the LED chips are being mounted, and enabling accurate positioning of the chips. Experience has demonstrated that it is possible by this procedure to keep the positional errors of the elements in the radiation source array below $\pm 16$ $\mu$m. This, in its turn, enables the errors in wavelength of the bands produced by the spectrometer incorporating the radiation source 1 to be limited to be within $\pm 0.3$ to $0.5$ nm on the wavelength scale when using the optical arrangement of the invention.

The reflector base 5 of the advantageous radiation source of FIG. 2a is made of material having good thermal conductivity, whereby the differential temperatures between the LED chips $3^1, \ldots, 3^{32}$ will be minimal and the implementation of the temperature pick-up 7 shown here will give a representative measurement of the true temperature of the LED chips during operation. Such representative temperature measurement enables accurate temperature stabilizing to be accomplished for the LED chips $3^1, \ldots, 3^{32}$ Copper is well suited for material to make the reflector base 5, as regards thermal conductivity. Being a malleable substance, it is also amenable to be embossed, using a die pressing tool, to endow the array of non-imaging concentrators $6^1, \ldots, 6^{32}$ with desired shape. Copper can be coated with a suitable reflector coating, e.g. galvanic gold plating.

Still referring to FIG. 2a, the radiation source 1 is composed of an array, produced in a copper block with the aid of a die pressing tool, of 32 non-imaging concentrators $6^1, \ldots, 6^{32}$ of modified configuration; of LED chips $3^1, \ldots, 3^{32}$ mounted on the bottom of said concentrators; and of a temperature pick-up 7 monitoring the temperature of the copper block, which may be a miniature thermistor.

The practical implementation design of FIG. 2a could, advantageously, contain 32 chips as follows:

2 off, GaAlAs LEDs, with central wavelength 840 nm: LEDs $3^1$ and $3^2$;

13 off, GaAlAs LEDs, with central wavelength 880 nm: LEDs $3^3$ through $3^{15}$;

8 off, GaAs LEDs, with central wavelength 940 nm: LEDs $3^{16}$ through $3^{23}$;

9 off, InGaAsP LEDs, central wavelength 1020 nm: LEDs $3^{24}$ through $3^{32}$.

The LED chips are about 0.30 by 0.30 by 0.20 mm in size. The section of thenon-imaging concentrator 6 of those reflector bases which have been made is rectangular, cross secton on the bottom about 0.32 by 0.34 mm, at the front face about 0.64 by 0.70 mm, and depth of the reflector about 0.50 mm. It was desired to pack the 32 concentrated radiators comprised in the radiation source in a tight array so as to achieve small overall dimensions of the spectrometer. The length of the array was chosen to be 12.0 mm, making the spacing of consecutive LED radiators 0.387 mm. So tight packing is not possible in one row using LED chips of standard type and the dimensioning stated above; therefore, the LED radiators are placed in two side-by-side, suitably intercalated rows in an advantageous embodiment. In conformity herewith, the size of the output slit has been set to be long enough, advantageously 0.7 mm by 2.5 mm, whereby the radiation spectra produced in the parallel rows will be imaged on one and the same output slit, by effect of the geometry of the optical means. The dimensioning of the non-imaging concentrator 6 and its use for optics matching the concentrators, detectors and light sources is known in the literature. FIG. 2b displays a non-imaging concentrator dimensioned according to methods described in the literature by which it is possible to collect the radiation emitted into semispace by any planar light source, in its entirety, and to direct it into a solid angle of desired magnitude.

In the design solution of the invention, the configuration of the non-imaging concentrator 6 is calculated, following the idea shown in FIG. 2b. The concentrator 6 is dimensioned to receive a cone of radiation emitted into semispace by the LED chip 3, and to direct it into asmaller solid angle consistent with the spectrometer's NA (NA=numerical aperture). It is thus possible in principle, when using the radiation source 1 of the invention, to collect 100% of the radiation emitted by the LED chip, into the input aperture of the spectrometer optics 4. This design results in improved optical efficiency and, consequently, in improved attainable signal/nois ratio of the spectrometer. It moreover improves the attenuation in the non-pss band because collection of the beam will minimize the radiation falling outside the input aperture, which radiation often tends to become coupled with the output beam, to constitute a signal present in the inhibition band. In practice, the collected cone is broadened by any non-ideal features of the non-imaging concentrator construction, such as departure from ideal reflector shape, surface quality and implementation of the concentrator with curtailed length, and the proportion of the cone directed into the NA of the spectrometer, relative to the radiation emitted by the LED chip, is thus somewhat reduced by their effect.

Referring further to FIG. 2b, and to FIG. 2c, the base plate 2 of the radiation source is made of $Al_2O_3$ ceramics, and the conductor patterns required for electric connection of the LED array have been printed on it by means of thick film technique. All LED chips $3^1, \ldots, 3^{32}$ get their common bottom contact through the reflector base 5. The chips $3^1, \ldots, 3^{32}$ are fixed on the reflector base 5 with conductive epoxy, or by soldering. From the contact base on the top face of each chip $3^1, \ldots, 3^{32}$, a wire contact 9 has been bonded with 25 $\mu$m gold wire, or equivalent, to the thick film wiring, whereby the LED radiators $3^1, \ldots, 3^{32}$ can be individually activated with the drive current. The LED radiators are protected by a window element 10, and the intervening space between the windon and the LED elements is filled with transparent, extra pure epoxy or silicone 11 for protection of the semiconductor chips against ambient influence, and for matching the refractive index of the medium to be closer to that of the GaAs and InGaAsP materials. Such refractive index matching improves the coupling efficiency at the interface of the LED chips $3^1, \ldots, 3^{32}$ and the transmitting medium, and minimises the reflections occurring from the window 10 of the construction.

In FIG. 2c is presented a concentrator arrangement in which the bottom of the concentrator is utilised in positioning the LED chip 3. The side length B of the LED chip is 300 $\mu$m in this exemplary case. The length of the bottom A, in the direction of the row, is advantageously selected to be 320 $\mu$m, whereby the bottom allows a positioning error of the chip, in the direction of the row, of $\pm 10$ $\mu$m. The tolerance of positioning of the chip in the direction across the row is not subject to the same requirement as that longitudinally to the row, because errors in positioning incurred in transverse direction cause no errors in wavelength. With this understanding, the bottom breadth in transverse direction has been selected to be 340 $\mu$m, leaving a potential transverse positioning error amounting to $\pm 20$ $\mu$m.

FIG. 3 presents the design of an LED spectrometer module according to the invention, and of its optics 4, which has been implemented as an integral, cemented glass construction. The optics 4 consists of a first and a second prism 14,17 serving as a frame structure and medium; a plane mirror 15 interposed between them; a concave mirror 19; an absorber 22; and a reflection grating 18 cemented under the structure. The mirror coating 25 has been removed from a region in the centre of the plane mirror 15, minimizing the area of the aperture in the manner seen by reference to FIG. 3, involving loss of no more than 25% of the mirror area, whereby the cone of radiation from the LED radiation source, indicated by a dotted line 26, is admitted through said aperture to impinge on the concave mirror 19, and similarly the cone coming from the concave mirror can proceed to the output slit 12. Behind the output slit 12, an optical fibre, or fibre bundle, 13 has been affixed to carry the output beam to the sample being measured.

Furthermore, the spectrometer module depicted in FIG. 3 comprises a radiation source 1, disposed close to the output slit 12. To the radiation source 1 has been attached in thermally conductive fashion, a Peltier element 8, by the aid of which the heat generated by the light elements $3^1, \ldots, 3^n$ is transferred through a cooling plate 20 to ambient air, in order to stabilize the radiation wavelength.

It is thus understood that the LED spectrometer of the invention comprises, as an eminently significant component, sn optics module 4 designed to be fixedly joined in conjunction with the LED radiation source 1, this module making the assembly into an electrically controlled sweeping spectrometer operating without moving parts. The LED spectrometer optics assembled in the form of a cemented glass construction is known in prior art through the reference WO 94/15183, cited above. The LED spectrometer optics 4 differs from prior art in its optical arrangement and in its mode of operation. Thanks to the changes that are apparent, the reproducibility of the LED spectrometer's wavelength scales, its optical efficiency and its manufacturability as an industrial component are substantially superior to those of the earlier design.

Implementation of the optics by the design based on mirror optics 4, as shown in FIG. 3, with glass as optic medium, has enabled high numerical aperture to be achieved. The high NA of the construction (NA=0.52, corresponding to f number 1.0) maximizes the collection efficiency for the radiation from the radiation source 1. The transmission of the optics, at central wavelength of the pass band, is 20 to 40%. The angles in the prism, mirror and grating construction have been so dimensioned that the grating 18 operates in autocollineation, as viewed in the plane of the spectrum, when the centremost element of the radiation source 1 is activated. With an advantageous grating 18 having 1400 lines per mm, the angle of the plane mirror 15 relative to the optic axis is then 32°, and the plane wave produced by the centremost LED meets the grating 18 under the angle of 26°. The output beam obtained through the output slit 12 will then be the centremost band of the wavelength scale for wavelength 940 nm. The plane waves produced by the extreme elements in the radiation source 1 will then meet the grating under angles of 19° and 33°, respectively, whereby the output beam will contain the bands for wavelengths 830 nm and 1080 nm, respectively.

Tuning the LED spectrometer to make the central point of its wavelength scale coincide with the desired value is accomplished in connection with assenbly, the LED radiation source 1 being correctly aligned in relation to the optics 4 in this work step. This adjustment is made in functional succession, wherein the output beam is measured with a spectrometer and the LED radiation source 1 is locked in stationary position with UV-curing optical cement when the wavelength scale has become properly aligned.

In the following, the functioning of an advantageous spectrometer shall be described, referrig to FIGS. 1 and 3. During operation, the temperature of the LED radiation source 1 is stabilized with the aid of an external PI controller receiving its measurement data from a thermistor 7 incorporated in the LED radiation source and controlling the Peltier element 8 comprised in the construction. The elements of the LED radiation source 1 are driven by means of current pulses supplied in suitable succession. The length of these drive pulses is typically between 100 and 500 $\mu s$; the current pulses have an amplitude between 10 and 1000 mA and the sweep frequency covering the entire array is typically 20 to 200 Hz.

The activated LED element emits radiation into semispace, the greater part of the radiation striking the walls of a non-imaging concentrator 6. The cone of radiation is directed by the reflecting wall, through prisms 14,17, towards the concave mirror 19 of the LED spectrometer's optics, this mirror collineating the beam back towards a plane mirror 15 in inclined position. The plane mirror reflects a proportion about 75% of the beam, down towards the grating 18. The spectral components of the beam are redirected in different directions towards the plane mirror 15, which reflects them back towards the plane mirror 19. The cones of radiation corresponding to different wavelengths are focussed by the concave mirror 19 to a spectrum formed upon the output slit 12. The output slit passes a narrow wavelength band having, typically, a spectral half-value width about 5% of the whole wavelength range covered by the spectrometer; that is, in an embodiment of the invention in connection with measurements on foodstuffs, when the wavelength range is 830 to 1050 nm, the half-value width of a single band will be 11.5 to 13.5 nm, according to measurements. This output beam proceeds by the fibre optics 13, to the sample under measurement. The intensity of the beam passing through the sample or reflected by it is detected by the aid of a Si detector 23, amplified, and converted to digital form by means of an A/D converter. The result from this measurement is proportional to the transmission or the reflectivity of the sample at the respective wavelength of the measuring beam.

The light elements $3^1, \ldots, 3^{32}$ of the LED radiation source 1 are all activated in similar way, each one in turn. The optics 4 creates respective spectra on the output slit 12, so that all 32 wavelength bands, one after the other, are obtained as output beam, covering the scale from 830 nm to 1050 nm. Taking into account the geometry of the sample arrangement, the transmission or reflection spectrum of the sample on said wavelength scale can be calculated from the measured signals.

Selection of the pulse currents supplied to the LED radiation source can be utilized to make optimal use of the A/D converter's dynamic range, to compensate for differences in output power between LED radiation sources, and to compensate for the spectral attenuation caused by different kinds of samples. If all these elements $3^1, \ldots, 3^{32}$ are driven at the same current level, the power of the stronger spectral bands of the measuring beam are typically up to tenfold, compared with the least powerful channels. The LED elements of less powerful spectral bands can be driven with current pulses of greater magnitude, thus eliminating variations in power, or they may be limited to be less than 1:2. for instance. It is then possible to achieve substantially equal maximum S/N ratio on all channels, and the dynamic range of the converter will thus be optimally utilized without any changes made in the gain of the amplifier stages during the fast pulsing sequence. The same technique can be employed in order to optimize the spectrometer for measurements of the transmission or reflection spectrum of a given type of sample. Hereby the typical spectral attenuation of a given sample, e.g. of a foodstudd raw material, will be taken into account in preselecting the currents for the LED elements $3^1, \ldots, 3^{32}$.

The invention is not exclusively delimited to concern the embodiment examples presented in the foregoing: numerous modifications can be contemplated within the scope of the inventive idea defined by the claims.

I claim:

1. A spectrometer, comprising a radiation source comprising a light element base and a plurality of light elements which are arranged on said light element base in row form with predetermined mutual spacing, and optical means disposed in conjunction with the radiation source, for collecting the radiation produced by said light elements, for dispersing it to a predetermined wavelength spectrum and for directing it to an object under measurement, wherein the radiation source comprises a reflector base disposed in conjunction with the light element base and on which the light elements have been arranged, and which comprises a concentrator corresponding to each light element and disposed in conjunction with each light element, for directing the radiation emitted by the light element into a predetermined solid angle.

2. The spectrometer of claim 1, wherein the concentrator has been formed by embossing in the reflector base a depression of predetermined configuration, the form of its bottom substantially matching the shape of the light element, whereby each light element can be accurately positioned with the aid of said concentrator, by placing the light element on the bottom of the concentrator.

3. The spectrometer of claim 1, wherein the concentrator is a non-imaging concentrator.

4. The spectrometer of claim 1, wherein the light elements are arranged in two parallel rows so that mutually adjacent light elements are intercalated with each other.

5. The spectrometer of claim 1, wherein the reflector base and a reflector surface of the concentrator are coated with a reflecting substance.

6. The spectrometer of claim 1, wherein the reflector base is made of electrically and thermally conductive material.

7. The spectrometer of claim 1, wherein the radiation source comprises a measuring element connected to the reflector base, for measuring the temperature thereof.

8. The spectrometer of claim 1, wherein the radiation source comprises a heat transfer element connected in thermally conductive fashion with the reflector base in the vicinity of the light elements, for cooling the radiation source.

9. The spectrometer of claim 1, wherein the light element base includes electric leads that are provided for electric supply to the light elements; that the light elements are affixed to the reflector base with an electrically conductive substance; and that electrical contact is provided to each light element from the reflector base.

10. The spectrometer of claim 1, wherein the radiation source comprises a window element, disposed substantially above the light elements and the concentrators to protect them against ambient influences; and that the intervening space between the window element and the light elements is filled with a light-transmitting substance.

11. The spectrometer of claim 1, wherein the radiation source comprises an output aperture, disposed in the vicinity of the radiation source, for conducting the radiation away from the radiation source, and an optical conduit, connected to the output aperture, for carrying the radiation emerging through the output aperture, to the object under measurement.

12. The spectrometer of claim 1, wherein the optical means comprise
- a first prism, disposed substantially in conjunction with the radiation source to receive radiation emitted by the radiation source;
- a plane mirror, in which a pass-through aperture has been provided to admit the radiation emitted by the radiation source to pass through the plane mirror;
- a second prism, disposed in conjunction with the first prism in such manner that the plane mirror is disposed between the first and second prisms;
- a reflection grating for dispersing the radiation emitted by the radiation source to a wavelength spectrum; and
- a concave mirror, located at a distance from the radiation source and disposed in conjunction with the second prism, for reflecting the radiation to the reflecting grating and through the pass-through aperture to an output of the radiation source.

13. The spectrometer of claim 1, wherein said optical means comprises a concave mirror, a plane mirror, a pass-through aperture defined in the plane mirror, and a reflection grating, and wherein the wavelength spectrum produced with each light element is disposed to pass through the pass-through aperture, to be reflected by the concave mirror to the reflection grating and from the reflection grating over the plane mirror and the concave mirror, through the pass-through aperture to an output aperture of the radiation source.

14. The spectrometer of claim 1, wherein said optical means comprises a plane mirror, a concave mirror and a reflection grating, and wherein each of the light elements, the plane mirror, the concave mirror and the reflection grating are so arranged relative to each other that at an output aperture of the radiation source, a different wavelength spectrum is obtained with each light element.

* * * * *